United States Patent
Spannbauer et al.

(10) Patent No.: US 10,604,931 B2
(45) Date of Patent: Mar. 31, 2020

(54) SEALING ELEMENT

(71) Applicant: Sapa AS, Oslo (NO)

(72) Inventors: Manfred Spannbauer, Ulm (DE); Christian Rauprich, Elchingen (DE)

(73) Assignee: Sapa AS, Oslo (NO)

( * ) Notice: Subject to any disclaimer, the term of this patent is extended or adjusted under 35 U.S.C. 154(b) by 0 days.

(21) Appl. No.: 15/398,853

(22) Filed: Jan. 5, 2017

(65) Prior Publication Data
US 2017/0198476 A1 Jul. 13, 2017

(30) Foreign Application Priority Data

Jan. 8, 2016 (DE) .................. 10 2016 100 267

(51) Int. Cl.
| | | |
|---|---|---|
| *E04B 2/90* | (2006.01) | |
| *E04B 2/88* | (2006.01) | |
| *E06B 7/14* | (2006.01) | |
| *E04B 2/96* | (2006.01) | |
| *F16J 15/02* | (2006.01) | |
| *E06B 3/62* | (2006.01) | |
| *E06B 3/54* | (2006.01) | |

(52) U.S. Cl.
CPC ............. *E04B 2/885* (2013.01); *E04B 2/90* (2013.01); *E04B 2/967* (2013.01); *E06B 7/14* (2013.01); *F16J 15/025* (2013.01); *E06B 3/5427* (2013.01); *E06B 3/6202* (2013.01); *E06B 2003/6241* (2013.01); *E06B 2007/145* (2013.01)

(58) Field of Classification Search
CPC ... E04B 2/885; E04B 2/88; E04B 2/96; E04B 2/962; E04B 2/967; E04B 2/90; F16J 15/00; F16J 15/02; F16J 15/025; E06B 3/5427; E06B 3/6202; E06B 2003/6214; E06B 2007/145; E06B 7/14
USPC ........................................................ 277/637
See application file for complete search history.

(56) References Cited

U.S. PATENT DOCUMENTS

| | | | | |
|---|---|---|---|---|
| 3,471,985 A | * | 10/1969 | Lindelow ................ | E04B 2/60 52/204.591 |
| 8,826,611 B2 | * | 9/2014 | Veilleux ................ | C03C 27/048 52/204.593 |
| 2007/0028538 A1 | * | 2/2007 | Woelfert ................ | E06B 3/5427 52/204.1 |
| 2008/0216424 A1 | * | 9/2008 | Westphal ................ | E06B 1/6007 52/204.5 |
| 2008/0302036 A1 | * | 12/2008 | McMahon ............ | E04B 1/0046 52/284 |
| 2011/0099937 A1 | * | 5/2011 | Dampierre ............. | E06B 3/273 52/656.5 |
| 2012/0240492 A1 | * | 9/2012 | Woodward ............. | E06B 1/363 52/204.5 |
| 2014/0041316 A1 | * | 2/2014 | Norwood ................ | E06B 1/62 52/58 |

\* cited by examiner

*Primary Examiner* — Nathan Cumar
(74) *Attorney, Agent, or Firm* — Collard & Roe, P.C.

(57) ABSTRACT

Sealing element (1) for sealing joint gaps between elements of a facade of element mode of construction, wherein the sealing element (1) comprises a connecting flange (2) for securing the sealing element (1) to the facade element, and one or more sealing lips (3).

16 Claims, 5 Drawing Sheets

SEALING ELEMENT

CROSS REFERENCE TO RELATED APPLICATIONS

Figure 1:
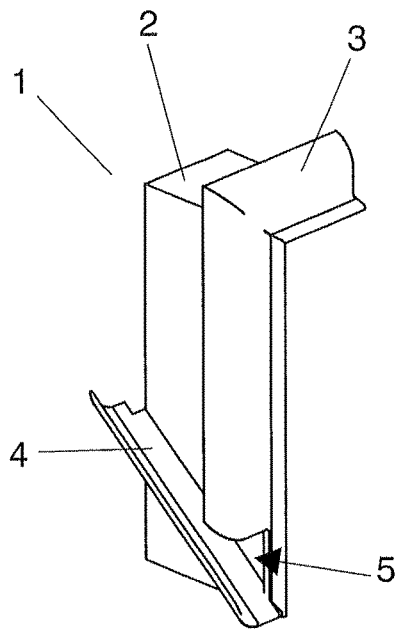

Applicant claims priority under 35 U.S.C. § 119 of German Application No. 10 2016 100 267.4 filed on Jan. 8, 2016, the disclosure of which is incorporated by reference.

The invention relates to a sealing element for sealing joint gaps between elements of a facade constructed in element mode of construction.

Devices are widely used and employed particularly in the mounting of element facades for achieving a short build time and a high level of installation accuracy.

For architectonic reasons an all-glass appearance is required for many constructions. Such an appearance can be achieved only if glass strips along the element edges or press strips over the joint gaps between the elements are dispensed with. Since glass strips and press strips protrude beyond the plane of the glass these would lead to inhomogeneity in the visual aspect of the glass.

In this way, all-glass facades are frequently produced in which the visual aspect is determined only by the glass panes. The gaps between the panes are moved into the background.

Such gaps, which are less visually noticeable, are usually sealed by sealing sections pre-mounted on the edges of the facade elements.

The facade elements then only have to be positioned adjacent to and above one another and secured.

Previous solutions have various disadvantages. These include, inter alia, the fact that it is often only possible to mount the facade elements in a specific sequence. In addition, there is often the disadvantage that the seals are in part not tight to beating rain. A further disadvantage is that water which has penetrated can be conducted away only poorly or not at all.

It is therefore an object of the invention to propose a sealing element which does not have the stated disadvantages.

According to the invention this object is fulfilled in that the sealing element has a connecting flange for securing the sealing element to the facade element, and one or more sealing lips.

The sealing element and thus also the sealing lips are thereby arranged at the intended place at the facade element. These are not displaced during mounting of the facade element.

According to the invention it is also very advantageous if the connecting flange is constructed as a web bearing against a side edge of the respective facade element.

This web ensures a very high level of stability without the sealing element in that case having to have an unnecessarily large size.

A further very advantageous embodiment is present when the sealing element is constructed as or comprises a corner member.

Good sealing can thus be guaranteed even, and particularly, in the corner region.

According to a further embodiment of the invention it is also very advantageous if the sealing lip has a curved or angled cross-section, in which case the bend or angle can be directed inwardly with respect to the sealing element.

A particularly good sealing result is achieved by such a geometric form. Apart from curved or angled cross-sections, semi-circular, circular, elliptical or closed or open polygonal cross-sections are also conceivable.

According to the invention it is also very advantageous if the sealing lip is arranged at the front edge or outer edge of the connecting flange.

A substantially planar surface which has a visually smooth effect is thereby achieved. In addition, penetration of water is avoided.

According to a development of the invention it is extremely advantageous if a lip extending inwardly and rising inwardly from the front edge or outer edge of the sealing element is provided.

Such a lip can be used for conducting out water which has penetrated. In addition, water and moisture emanating from chambers disposed further back or inwardly can be conducted away.

In that case it is very advantageous if the lip is constructed as a channel.

Water to be discharged is conducted very satisfactorily in the case of a channel. Bypassing of the lip is avoided.

Similarly, according to the invention it is also very advantageous if the sealing lip is provided in the region of the second lip with a recess, in which case the second lip can project through this recess.

Water is conducted away to the outside at the predetermined point by this design.

A further embodiment which is very advantageous in accordance with the invention is present if the lips of two adjacent sealing elements bear against one another or engage one over the other and then form a common channel.

The channel is thus formed when the facade elements are joined together.

According to an embodiment of the invention it is extremely advantageous if the gradient of the channel is between 30 and 70° relative to the horizontal, preferably between 35 and 60°, particularly 40°.

It is thereby ensured that adhesion of the water is overcome and even smaller drops are reliably conducted away.

According to the invention it is similarly very advantageous if the recess has such a size that adhesion of water to be passed through does not lead to a build-up.

Build-ups would lead to forcing of the water into other chambers or regions thereunder. This is not desired.

A further very advantageous development of the invention is present if the sealing lip is constructed in such a way that the sealing lips of two adjacent sealing elements are capable of bearing against one another and thus a seal is produced.

A very good seal is thereby created.

A very advantageous development of the invention can also be seen if the sealing element forms a corner element, wherein adjacent corner elements are connected together by way of a connecting flange and sealing lip.

Larger sections without abutment edges are thus formed. The absence of abutment edges ensures that as little water as possible penetrates.

In that case it has proved particularly advantageous if four interconnected sealing elements together form a sealing frame in which channels are provided in at least a part of the corners.

The sealing frame can be placed around the facade element and thus remains up to and including mounting of the facade elements on site. Moreover, very good sealing is ensured.

Figure 2:
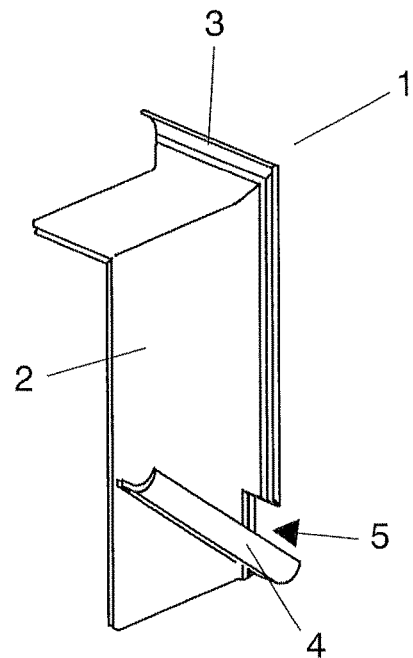
Figure 3:
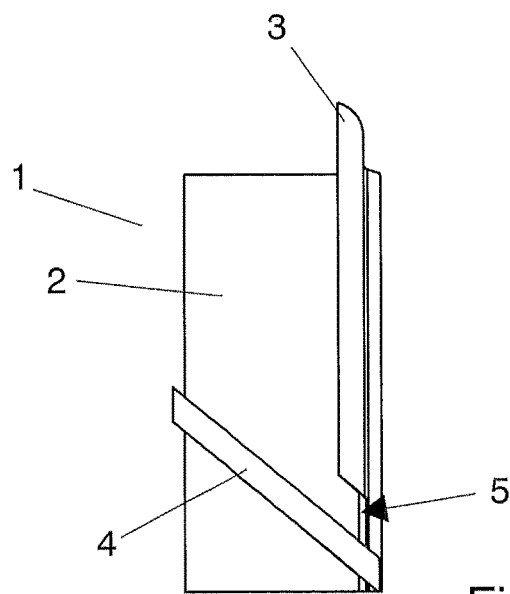
Figure 4:
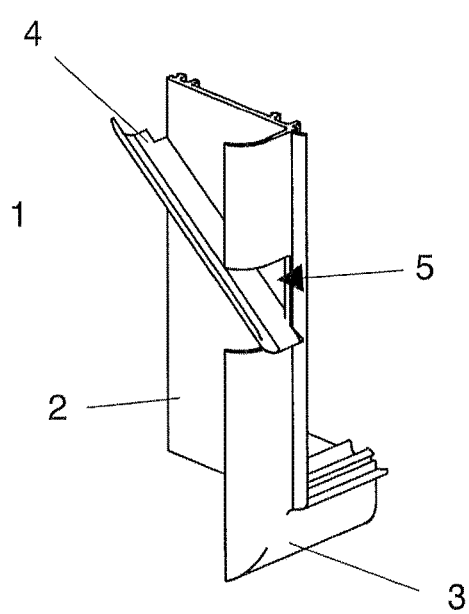
Figure 5:
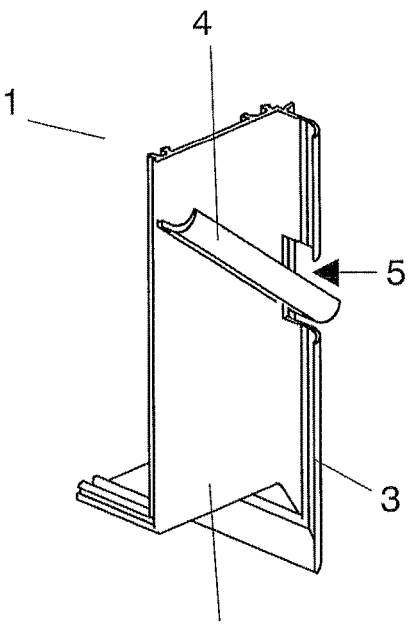
Figure 6:
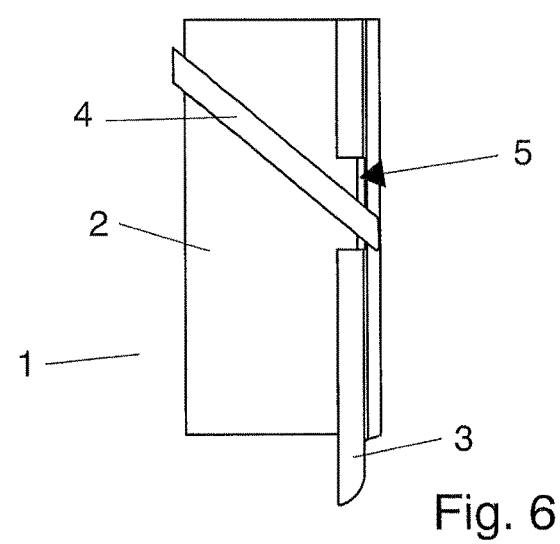
Figure 7:
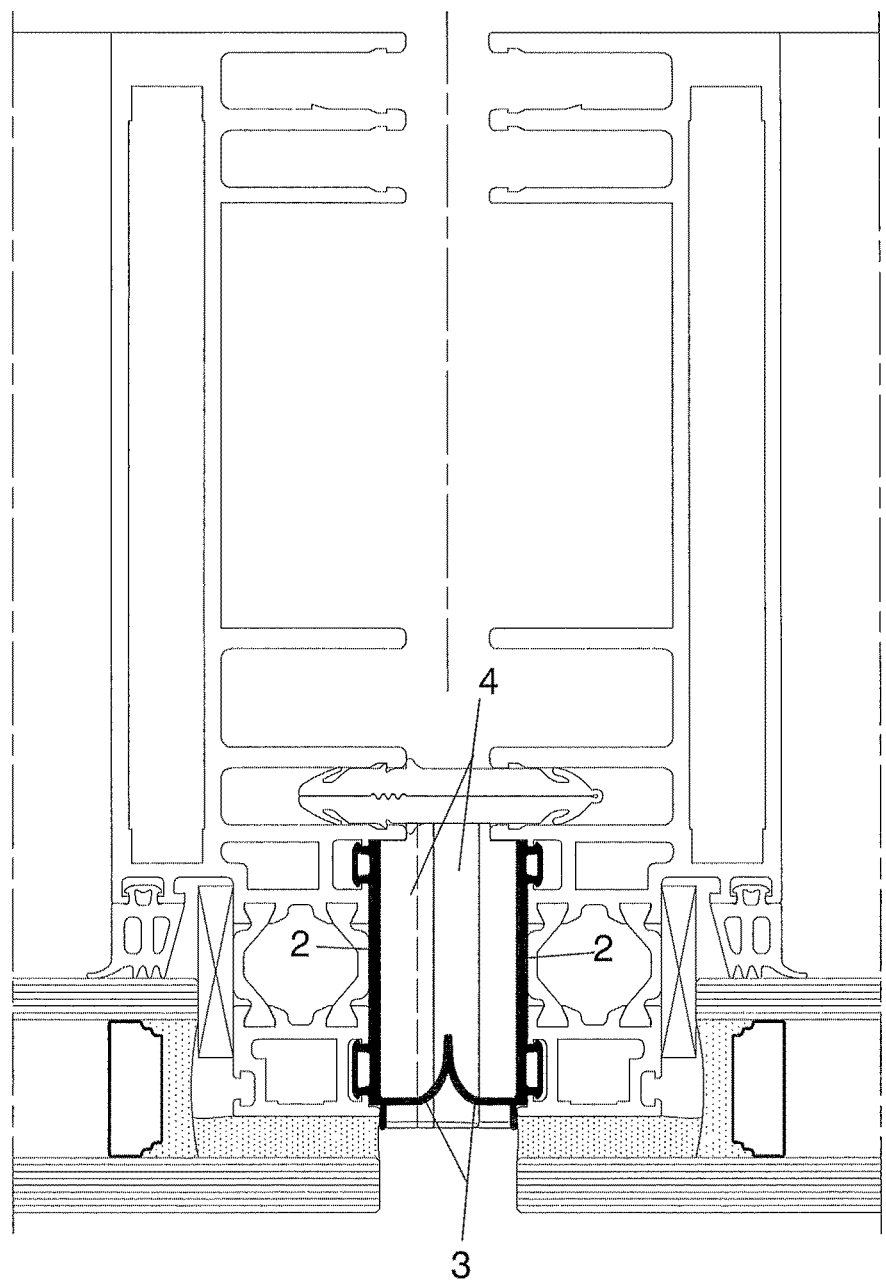
Figure 8:
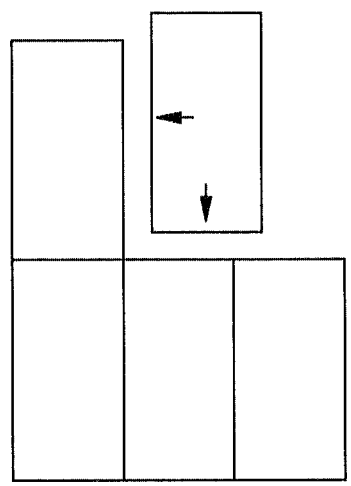
Figure 9:
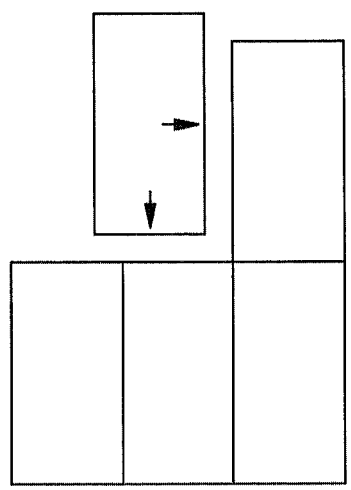
Figure 10:
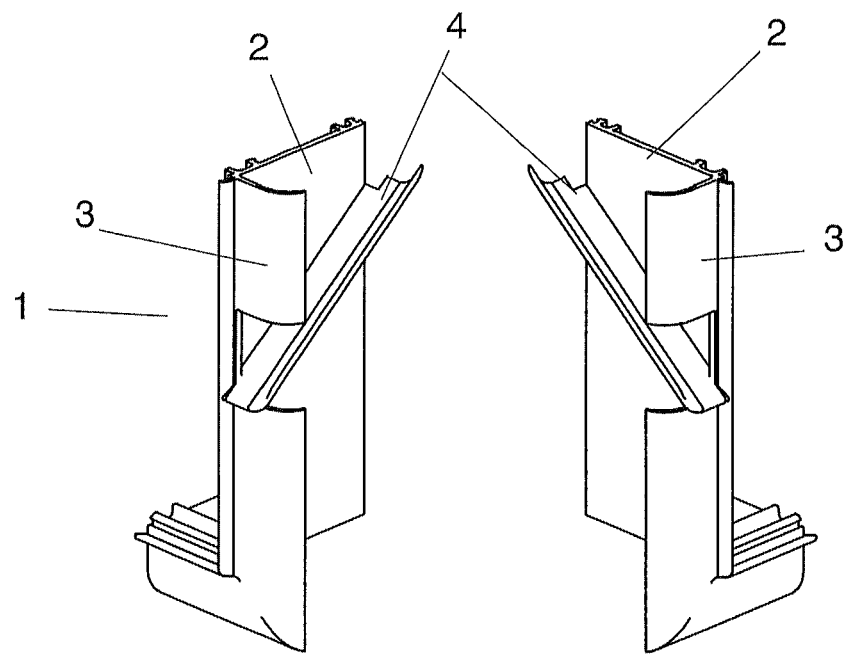
Figure 11:
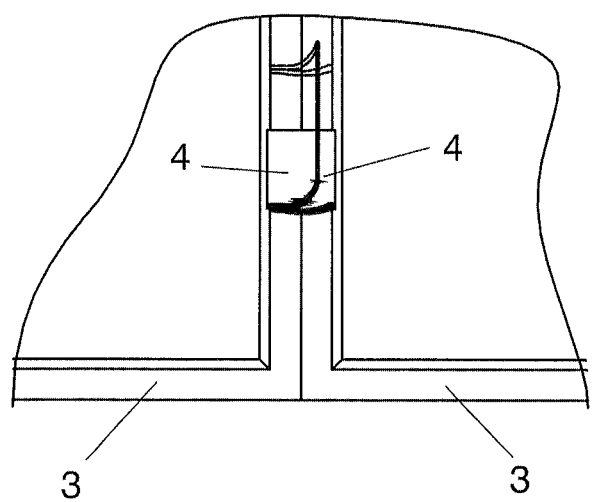

The invention is explained in the following by way of an embodiment, wherein:

FIG. 1 shows a diagram of a sealing element, which is constructed as an upper corner, for a facade element, FIG. 2 shows a rearward diagram of the same sealing element, FIG. 3 shows a side view of the same sealing element, FIG. 4 shows a diagram of a sealing element, which is constructed as a lower corner, for a facade element, FIG. 5 shows a rearward diagram of the same sealing element, FIG. 6 shows a side view of the same sealing element, FIG. 7 shows a horizontal section through two mutually adjacent sealing elements, FIG. 8 shows a schematic diagram of the assembly of a suspended facade of facade elements working from left to right, FIG. 9 shows a schematic diagram of the assembly of a suspended facade of facade elements working from right to left, FIG. 10 shows a diagram of two mutually adjacent sealing elements and FIG. 11 shows a front view of a facade member with two sealing elements in installed state.

A sealing element, which as seen from the outside is provided as an upper left corner for a facade element, is denoted by 1 in FIG. 1.

In the case of suspended facades, distinction is usually made between element facades and post-and-rail facades. Element facades are composed of individual facade elements which are suspended at suspension means at the building, preferably at the building roof. For that purpose, the facade elements are mounted on the building with, for example, the help of a crane, in that each element is attached to an already mounted neighbouring element or element arranged thereunder. The mode of working can in that case be from left to right or from right to left, as illustrated by FIGS. 8 and 9.

In the case of element facades, water can penetrate or condensate can form at different places.

Both have to be conducted away to the outside.

The sealing element 1 according to the invention is provided for that purpose.

The sealing element 1 is constructed from a connecting flange 2 and a sealing lip 3 arranged thereat.

The connecting flange 2 nests against the side edge of the facade element. The inwardly bent sealing lip 3 is arranged at its front edge.

When assembling the facade elements to form a facade, two sealing lips 3 of adjacent facade elements abut one another and thus ensure sealing of the facade elements relative to one another.

In this embodiment, the connecting flange 2 is led around the corner of the facade element and is suitable for the upper lefthand corner of the facade element.

Provided for the other corners of the facades elements are identical variants, which are adapted to the respective corner, of the sealing element 1, as shown in, for example, FIGS. 4, 5 and 6. A lower lefthand corner is illustrated there.

The sealing lip 3 similarly extends over the corner.

A lip 4 is provided at the vertical section of the connecting flange 2 and, as seen from the front, rises at an inclination in rearward direction and extends over substantially the entire depth of the connecting flange 2.

It is conceivable for the lip 4 to be shorter or longer than the depth dimension of the sealing element.

The depth of the connecting flange 2 is matched to the depth of the facade element and usually corresponds therewith.

In addition, a recess 5 through which the lip 4 can project is provided in the sealing lip 3, as illustrated in the present embodiment.

However, it is also conceivable for the lip 4 to be flush with the sealing lip 3.

Water or condensate present in the intermediate space between two facade elements is conducted away outwardly over the lip 4 in accordance with gravitational force and can then drip off in front of the facade or run downwardly thereat.

For that purpose, the lip 4 forms a channel in which the water or condensate is conducted away.

In the case of assembly of several facade elements, adjacent lips 4 abut one another or also mutually overlap.

In both cases a channel can thereby be formed. The lips 4 then have a curved or angled cross-section. It is also conceivable for each lip 4 to form an individual channel.

The lip 4 extends so as to rise at an angle in inward direction. The angle of inclination is in that case between 30 and 70° relative to the horizontal, preferably between 35 and 60°. Particularly good results were achieved with an inclination of about 40°.

In that case, deposit of drops of water by adhesion to the lip 4 and thus creation of build-ups are prevented.

In addition, any dirt which may have penetrated is flushed away with and at the time of outflow of the water or condensate, since the flow speed is sufficiently high.

The recesses 5 are so adapted with respect to the size thereof that water does not build up due to surface tension, but is directly conducted away.

A connection, which is not illustrated here, can be provided between two sealing elements 1 of a facade element. This will advantageously connect the connecting flanges 2 and provide a connection of the sealing lips 3. The sealing lips 3 are then formed over the full length of the connection.

By contrast, the connection of the connecting flange 2 can be executed with, for example, reduced depth.

A frame which embraces the respective facade element is formed by the connections of several sealing elements.

In that case, sealing elements 1 can be provided in all corners of the facade element.

Discharge of penetrated water and condensate can thus be ensured at all corners particularly in the case of larger facades, so that the amount of water and condensate present in the intermediate spaces does not increase too strongly and possibly force the liquid onto the inner side of the facade.

The sealing element can be attached to the facade element prior to installing the facade element to a building and the sealing element is a monolithic element.

The invention claimed is:

1. Sealing element for sealing joint gaps between elements of a facade element mode of construction, the sealing element comprising:
    a connecting flange for securing the sealing element to the facade element, the connecting flange having a height, a front, a rear, and a depth extending from the front to the rear,
    a first lip connected to the connecting flange, the first lip being a sealing lip, and
    a second lip connected to the connecting flange along the depth of the connecting flange and rising from the front of the connecting flange in a direction towards the rear of the connecting flange;
    wherein the sealing element can be attached to the facade element prior to installing the facade element to a building;
    wherein the second lip is formed as a channel; and
    wherein a gradient of the channel is between 30 and 70° relative to the horizontal.

2. Sealing element according to claim 1, wherein the connecting flange is constructed as a bar bearing against a side edge of the respective facade element.

3. Sealing element according to claim 1, wherein the sealing element is constructed as or comprises a corner member.

4. Sealing element according to claim 1, wherein the first lip sealing lip has a curved or angled cross-section.

5. Sealing element according to claim 4, wherein the curved or angled cross section is directed inwardly with respect to the sealing element.

6. Sealing element according to claim 1, wherein the first lip sealing lip is arranged at the front edge or outer edge of the connecting flange.

7. Sealing element according to claim 1, wherein the sealing element forms a corner element.

8. A sealing element system comprising:
a first sealing element according to claim 7; and
a second sealing element according to claim 7;
wherein the first sealing element is adjacent to the second sealing element; and
wherein the first sealing element and the second sealing element are connected together by way of the connecting flange of the first sealing element and by way of the connecting flange of the second sealing element.

9. A sealing element system comprising:
a first sealing element according to claim 1; and
a second sealing element according to claim 1;
wherein the second lip of the first sealing element bears against or engages over the second lip of the second sealing element and thus forms a channel.

10. A sealing element system comprising:
a first sealing element according to claim 1; and
a second sealing element according to claim 1;
wherein the first lip of the first sealing element bears against the first lip of the second sealing element and thus forms a seal.

11. A sealing frame comprising:
a first sealing element according to claim 1;
a second sealing element; and
a third sealing element;
wherein the first sealing element, the second sealing element, and the third sealing element are connected with one another;
wherein the second lip of the first sealing element comprises a channel; and
wherein the channel is disposed in a corner of the sealing frame.

12. Sealing element according to claim 1, wherein the gradient of the channel is between 35 and 60° relative to the horizontal.

13. Sealing element according to claim 1, wherein the gradient of the channel is 40° relative to the horizontal.

14. Sealing element for sealing joint gaps between elements of a facade element mode of construction, the sealing element comprising:
a connecting flange for securing the sealing element to the facade element, the connecting flange having a height, a front, a rear, and a depth extending from the front to the rear,
a first lip connected to the connecting flange, the first lip being a sealing lip, and
a second lip connected to the connecting flange along the depth of the connecting flange and rising from the front of the connecting flange in a direction towards the rear of the connecting flange; and
the sealing element can be attached to the facade element prior to installing the facade element to a building;
wherein the first lip sealing lip is provided with a recess in the region of the second lip.

15. Sealing element according to claim 14, wherein the recess is of such a size that adhesion of water passing through does not lead to build-up.

16. Sealing element according to claim 14, wherein the second lip projects through the recess of the first lip.

* * * * *